March 10, 1931.   G. A. KENT   1,796,031

STOCK FEED

Filed Feb. 18, 1929

Inventor
Gage A. Kent
by Bair, Freeman & Sinclair
Attorneys

Witness
Vinton Read

Patented Mar. 10, 1931

1,796,031

UNITED STATES PATENT OFFICE

GAGE ALLISON KENT, OF INDIANOLA, IOWA

STOCK FEED

Application filed February 18, 1929. Serial No. 340,880.

The object of this invention is to provide an improved article of manufacture, namely a stock feed composed of chunks or pieces of cracked pressed oil cake with a substantially uniform and continuous coating of sorghum molasses, this coating being provided with a dusting of fine meal.

A further object of the invention is to provide an improved stock food composed of cracked pressed oil cake and a coating of sorghum molasses put together in such manner that the finished product will maintain its shape and condition after manufacture regardless of extremes of temperature to which it may be subjected.

Still another object of the invention is to provide an improved stock food composed of pieces of cracked pressed, oil meal in chunks of various sizes and also including sorghum molasses and fine-ground cotton cake meal, these elements being combined in such a way that the resultant product is in convenient form for handling and for feeding and will not lose its shape or identity by being subjected to extremes of heat or cold.

With these and other objects in view, my invention consists of the improved combination of elements and the improved method of combining such elements, as hereinafter set forth, pointed out in the claims and illustrated in the accompanying drawings, in which:

For some little time, it has been customary to use the so-called "cracked pressed oil cake" for feeding to live stock such as cattle and it has also been customary to use sorghum molasses in a stock food mixture including such substances.

Heretofore, it has been customary in preparing stock foods composed of the substances named, to merely mix these substances in a more or less imperfect way so that substantially given proportions of both substances are present in the completed product which is in the form of a more or less conglomerate mass.

This method produces a product, which, inasmuch as it contains a sticky and viscous substance, is subject to undesirable alterations when subjected to extreme heat or cold. For instance, when the product is subjected to high temperatures, the molasses will melt and run and will cause the particles composing a given mass to adhere to each other and thus render the substance very difficult and disagreeable to handle. Likewise, when subjected to cold, the molasses will harden or even freeze and thus cause the particles composing the mass to adhere to each other so that portions must be chopped or broken off before being available for feeding purposes.

It is obvious that under such conditions it is difficult to find a suitable method of storing, packing or transporting the feed and if it is placed in sacks or the like, which is the usual method followed, it becomes very difficult at times to use the feed.

My invention contemplates the use of the ingredients above named to produce a stock food which is convenient to handle and to feed and which is not subject to the objections above noted.

In this connection it may be stated that the cracked pressed oil cake which I have referred to is the product resulting from expressing the oily content from flax seed or cotton seed. Both of these substances are on the market in two forms, namely a finely divided meal or powder and in small lumps or chunks usually known as "pea size" meal.

Figure 1:
Figure 1 is a view of a lump of cracked pressed oil cake which forms the base for producing my improved stock food.
Figure 2:
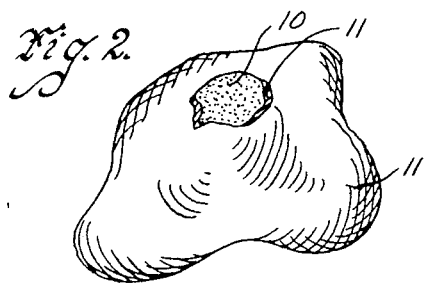
Figure 2 is a similar view showing a similar lump to which has been applied a coating of sorghum molasses.
Figures 3, 4:
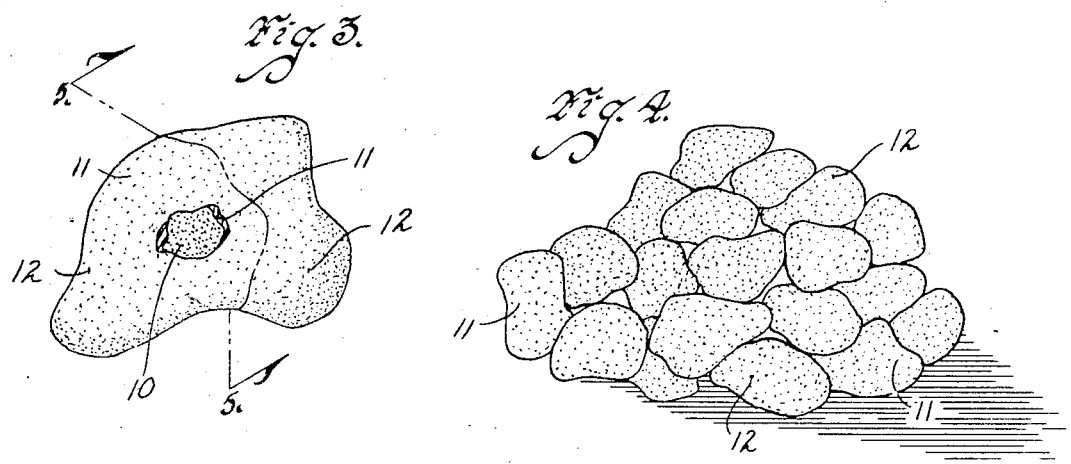
Figure 3 is a similar view showing the article in its completed state after having received a final dusting of fine meal.
Figure 4 is a view illustrating a heap or collection of lumps of the completed article of manufacture.
Figure 5:
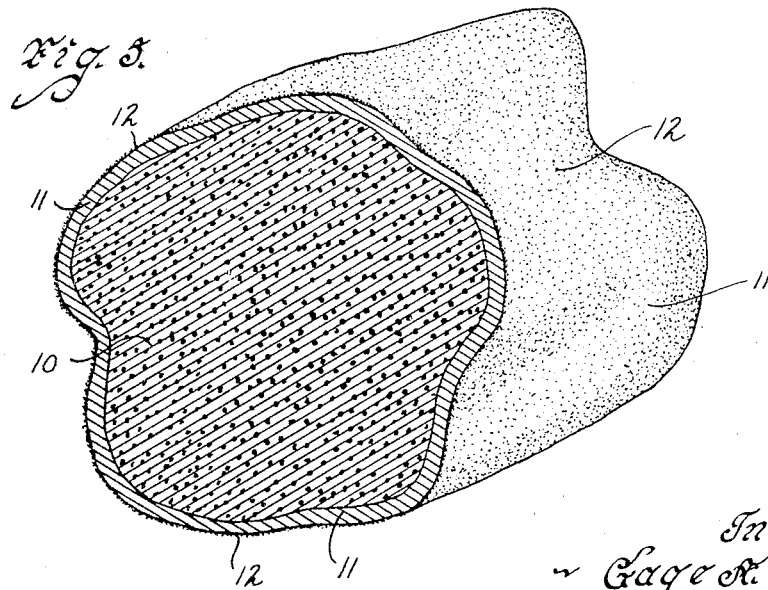
Figure 5 is an enlarged cross sectional view of a lump of my improved stock food taken on the line 5—5 of Figure 3.

In carrying out my improvement, I employ as a base, the cracked pressed oil cake pieces or lumps 10 Fig. 1.

Each of the lumps 10 is treated to provide it with a substantially uniform and continuous coating 11 of sorghum molasses, which is a desirable element on account of improving the taste as well as because of its own nutritive value.

The molasses coated pieces or lumps are then dusted or sprinkled with oily meal 12 in powdered form to produce a thin coating outside of the molasses coating and adhering thereto. The powdered meal, which is used for the final coating 12, preferably is of the same constituency as the lumps 10 except that it is finely comminuted, or in other words, is composed of the oily meal in its powdered form as distinguished from the cracked pieces or lumps of pressed oil cake.

The resulting product is a suitable protein supplemental feed for stock, which is composed of pieces or lumps, each containing a properly proportioned amount of both of the desirable substances, namely the cracked pressed oil cake and the sorghum molasses.

Because of the final coating 12 of fine powdered meal which adheres to and substantially covers the molasses coating 11, the pieces or lumps of feed will not adhere to each other, even when subjected to extremes of heat and cold and they may be conveniently packed in sacks or other desirable receptacles from which they may be poured or scooped without difficulty.

Any suitable means may be employed for mixing the substances and producing the finished product. A convenient way of doing this is to introduce the lumps 10 of cracked pressed oil cake and the sorghum 11 to a mixing machine and subject these substances to agitation for a length of time sufficient to thoroughly mix them and cause the molasses to thoroughly cover and coat each of the lumps. Thereafter, the finely powdered meal which forms the final coating 12 may be introduced into the mixer and further agitation or shaking be carried out, to cause such finely powdered meal to come into contact with and impregnate the molasses coating of each lump and afford an insulation to prevent the lumps from adhering to each other when piled or sacked.

This improved article of manufacture results in a stock food which includes well known desirable elements arranged in a convenient manner for handling, transportation, storage, and feeding purposes.

I claim as my invention:

1. As a new article of manufacture, a stock food composed of pieces of pea or nut-size cracked pressed oil cake, each piece having a substantially uniform and continuous coating of sorghum molasses, each molasses-coated piece having a final coating of powdered oil cake meal penetrating the molasses coating and affording an insulation to prevent the pieces from adhering to each other.

2. The method of forming a feed product consisting of highly non-absorbent pea or nut-size pieces of cracked pressed oil-cake, comprising coating said pieces of oil-cake with sorghum molasses to such a degree that the entire surface of the pieces have a thin coating of the molasses, thereafter agitating with a dusting material of ground pressed oil-cake which penetrates the molasses coating, absorbing the excess moisture of the molasses, thereby causing the molasses coating to dry and harden, leaving on the surface of the molasses coating a dust of the fine ground pressed oil-cake which serves as an insulator against the pieces adhering when piled or sacked.

Des Moines, Iowa, December 20, 1928.

GAGE ALLISON KENT.